United States Patent [19]

Flood et al.

[11] 3,832,434
[45] Aug. 27, 1974

[54] METHOD OF TREATING SILICON DIOXIDE DUST

[75] Inventors: Hakon Flood, Trondheim; Arne Seltveit, Moholtan, both of Norway

[73] Assignee: Elkem A/S, Oslo, Norway

[22] Filed: Oct. 2, 1972

[21] Appl. No.: 294,274

[52] U.S. Cl................................. 264/117, 23/313
[51] Int. Cl............................................... B01j 2/00
[58] Field of Search...................... 264/117; 23/313

[56] References Cited
UNITED STATES PATENTS
3,142,862   8/1964   Guldman ............................. 23/313

Primary Examiner—Robert F. White
Assistant Examiner—J. R. Hall
Attorney, Agent, or Firm—Eyre, Mann & Lucas

[57] ABSTRACT

A method of treating colloidal silicon dioxide dust is disclosed. The dust is admixed with water to form a nodulized product thereby reducing the problems normally encountered in connection with transportation and handling of silica-dust.

9 Claims, No Drawings

METHOD OF TREATING SILICON DIOXIDE DUST

The present application is a continuation-in-part of U.S. Pat. application Ser. No. 246,278 filed Apr. 21, 1972 and now abandoned.

The present invention relates to a method of treating colloidal silicon dioxide dust commonly found in waste gasses from furnaces producing metallic silicon or silicon-containing alloys.

The dust which is present in the waste gasses of furnaces producing silicon products is colloidal in nature. While the dust has found utility as a component of refractory ceramics, as a pigment material, as a filler in building materials and rubber, and as an anti-caking material for the fertilizing industry, many problems have been encountered because the dust is very light and voluminous. The dry dust has been packed in bags but both the filling and discharging of the bags is extremely messy because of the colloidal dust which is very difficult to handle, especially because it is very light. Additionally, the material is voluminous and hence the cost of transporting the material to the end use site is unreasonably high. It is important that the dusting problems and cost of transportation associated with this silica be reduced in order to make it more attractive to silicon product manufacturers to recover the dust since unrecovered dust is a highly undesirable environmental pollutant.

In accordance with the present invention both the problem of dusting and the problem of high cost of transportation have been substantially reduced by the process of adding water or other aqueous medium to the dust in order to form a suspension having a liquid consistency and then adding additional dust to convert the liquid to solid nodules. Not only do the nodules eliminate the dusting problem, but they also greatly decrease the bulk of the dust so that transportation costs are substantially reduced. While one would expect that transportation costs would be increased by the addition of water, it has been found that exactly the opposite is true since substantial savings in wolume can be realized by the addition of controlled amounts of water.

The process of the present invention comprises the admixing of water with silicon dioxide dust recovered from the waste gasses of furaces producing metallic silicon or silicon-containing alloys, agitating the admixture until a liquid product is formed and then adding additional increments of dust in small amounts and under strong agitation to form a thixotropic paste and continuing the agitation until solid nodules are obtained. It is important to note that the simple addition of water to the dust is not sufficient. When there is only the simple addition of water, the nodules of the present invention will not be formed. It is necessary to add sufficient water to form a liquid suspension and then add additional dust to form the nodules.

The invention is not limited to water, and other aqueous mediums may be used. Suitable additional materials which may be added to water to form suitable aqueous mediums include surfactants, wetting agents, dispersing agents and the like.

In the preferred embodiment of the invention, one part of water is admixed by weight with from about two to about four parts of colloidal silicon dioxide dust and agitated until it becomes liquid. Additional dust in increments of 0.1–1 0.3 parts are added strong agitation until a thixotropic paste is formed. The addition of dust is then discontinued but agitation is continued until the thixotropic paste is converted into solid nodules. Preferably, the mixing is continued until the nodules are the size of a walnut or smaller. A single walnut sized nodule will have a weight per volume of about 1,8 kilograms per liter which corresponds to about 1.45 kilograms per liter of dust. The weight of one liter of nodules is about 1.1 kilograms which corresponds to about 0.9 kilograms of dust. The weight of one liter of untreated dust is about 0.2–0.3 kilograms. It is thus seen that the weight by volume is substantially higher in the product of the present invention and this substantially reduces shipping costs. The weight by volume can be increased to an even greater amount by compressing the nodules to briquettes or by compressing the nodules to blocks which then may be cut to the required sizes.

When it is desired to use the nodules for the various purposes hereinbefore mentioned, the nodules can be transformed to a suspension of dust particles by the addition of water or other aqueous solution under mechanical agitation.

In one specific example, 3.5 kilograms of silicon dioxide dust was admixed with one kilogram of water under agitation. The silicon dioxide dust had been precipitated from the waste gasses of a furnace producing metallic silicon and was colloidal weighing approximately 0.2 kilograms per liter. After a short period of time the suspension of water and dust became liquid. An additional 0.7 kilograms of dust was added in 0.1 kilogram increments. At the addition of the seventh increment, the suspension had become a thixotropic paste and addition of dust was discontinued. Strong agitation was continued until walnut sized nodules were formed. The weight per liter of the nodulized product was 1.1 kilograms which corresponds to about 0.9 kilograms of silicon dioxide dust. The nodules were virtually free of the dusting problems normally associated with silicon dioxide and were easily packaged. The nodules were returned to suspension form by the addition of ½ kilograms of water under agitation.

It will be understood that the claims are intended to cover all changes and modifications of the preferred embodiments of the invention, herein chosen for the purpose of illustration, which do not constitute departures from the spirit and scope of the invention.

What is claimed is:

1. A method of treating silicon dioxide dust particles recovered from the waste gasses of furnaces producing materials selected from the group consisting of metallic silicon and silicon-containing alloys comprising:
   a. admixing under agitation a sufficient amount of aqueous medium with the dust to form a suspension of silicon dioxide dust particles in aqueous medium, said suspension having a liquid consistency;
   b. continuing the agitation and adding to the admixture a plurality of increments of dust until a thixotropic paste is formed;
   c. discontinuing the addition of increments of dust; and
   d. continuing the agitation until nodules are formed.

2. The method of claim 1 wherein the agitation in step (d) is continued until walnut sized nodules are obtained.

3. The method of claim 1 wherein the aqueous medium is water.

4. The method of claim 1 further including the step of compressing the nodules formed in step (d) thereby increasing the weight by volume.

5. The method of claim 1 wherein the nodules of step (d) are admixed with sufficient aqueous medium and agitated to form a suspension of dust particles in aqueous medium.

6. A method of treating silicon dioxide dust particles recovered from the waste gases of furnaces producing materials selected from the group consisting of metallic silicon and silicon-containing alloys comprising:
   a. admixing under agitation 1 part water with from about 2 to about 4 parts by weight of dust to form a suspension of silicon dioxide dust particles in aqueous suspension, said suspension having a liquid consistency;
   b. continuing the agitation and adding to the admixture a plurality of increments of from about 0.1 to about 0.3 parts of dust;
   c. continuing the addition of increments of dust until a thixotropic paste is formed;
   d. discontinuing the addition of increments of dust; and
   e. continuing the agitation until nodules are formed.

7. The method of claim 6 wherein the agitation in step (e) is continued until walnut sized nodules are obtained.

8. The method of claim 6 further including the step of compressing the nodules formed in step (e).

9. The method of claim 6 wherein the nodules of step (e) are admixed with sufficient aqueous medium and agitated to form a suspension of dust particles in aqueous medium.

* * * * *